(12) United States Patent
Lee

(10) Patent No.: US 6,701,247 B2
(45) Date of Patent: Mar. 2, 2004

(54) DIAGNOSTIC METHOD AND SYSTEM FOR A MANIFOLD AIR PRESSURE SENSOR

(75) Inventor: Jae-Hyung Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/334,924

(22) Filed: Dec. 31, 2002

(65) Prior Publication Data

US 2003/0195682 A1 Oct. 16, 2003

(30) Foreign Application Priority Data

Apr. 12, 2002 (KR) ........................ 2002-20028

(51) Int. Cl.[7] .............................. G06F 19/00; G06G 7/70
(52) U.S. Cl. ........................... 701/114; 701/34; 701/29; 340/438
(58) Field of Search .................... 701/114, 115, 701/101, 102, 29, 107, 34; 123/406.62, 480, 406.13, 479; 340/438; 73/1.58, 117.3, 118.1, 118.2

(56) References Cited

U.S. PATENT DOCUMENTS

| | | | | |
|---|---|---|---|---|
| 5,605,135 A | * | 2/1997 | Netherwood | ................ 123/479 |
| 6,170,475 B1 | * | 1/2001 | Lewis et al. | ........... 123/568.21 |
| 6,425,373 B1 | * | 7/2002 | Robichaux et al. | ......... 123/436 |

* cited by examiner

Primary Examiner—Willis R. Wolfe
Assistant Examiner—Johnny H. Hoang
(74) Attorney, Agent, or Firm—Morgan Lewis & Bockius LLP

(57) ABSTRACT

A MAP (Manifold Air Pressure) sensor diagnostic method for a vehicle is provided which uses a calculated intake manifold air pressure as the intake manifold air pressure if the output signal of the MAP sensor is not within a predetermined range, or if the difference between the intake manifold air pressure indicated by the MAP sensor signal and the calculated intake manifold air pressure is not less than a predetermined value.

22 Claims, 5 Drawing Sheets

DIAGNOSTIC METHOD AND SYSTEM FOR A MANIFOLD AIR PRESSURE SENSOR

FIELD OF THE INVENTION

The present invention relates to a manifold air pressure sensor for a vehicle, and more particularly, to a method and a system for diagnosing malfunctions of the manifold air pressure sensor, based on an estimate of manifold air pressure.

BACKGROUND OF THE INVENTION

Generally, an amount of fuel injected into a combustion chamber of a cylinder is determined based on mass air flow. In order to detect mass air flow, a mass air flow sensor (hereinafter referred to as a MAF sensor) or a manifold air pressure sensor (hereinafter referred to as a MAP sensor) is utilized.

The MAF sensor directly detects the mass air flow and provides a signal based on the detected mass air flow to an engine control unit. When a MAP sensor is utilized to ascertain the mass air flow, the engine control unit generally determines the mass air flow from the manifold air pressure detected by the MAP sensor, and inlet air temperature.

Therefore, when the mass air flow is to be ascertained based on a signal of the MAP sensor, the mass air flow cannot be determined if there are malfunctions of the MAP sensor. In this case, the engine may not operate optimally, and it becomes difficult to start the engine or obtain high engine torque. Further, the air/fuel ratio cannot be controlled and large amounts of emission gases are exhausted.

For these reasons it is important to diagnose malfunctions of the MAP sensor. But, diagnosing methods are typically performed based only on whether the signal of the MAP sensor is within a predetermined range. Thus, when the signal of the MAP sensor is fixed at a value between the upper threshold and the lower threshold, or the output of the MAP sensor is distorted by an electrical short of an output line of the MAP sensor, the conventional method cannot detect problems with the MAP sensor. Furthermore, during a malfunction of the MAP sensor, the manifold air pressure is estimated based on a current engine speed and a current throttle position, which does not allow the engine to be operated optimally. Therefore, there is a need in the art for an improved method and system for diagnosing a MAP sensor.

SUMMARY OF THE INVENTION

In a preferred embodiment of the present invention, MAP (Manifold Air Pressure) sensor diagnostic method comprises: determining whether a MAP sensor signal is within a predetermined range; calculating an intake manifold air pressure based on one or more engine operating parameters; determining whether a difference between a sensed intake manifold air pressure indicated by the MAP sensor signal and the calculated intake manifold air pressure is less than a predetermined value, if it is determined that the MAP sensor signal is within the predetermined range; and selecting the calculated intake manifold air pressure as an actual intake manifold air pressure if the MAP sensor signal is not within the predetermined range, or if the difference between the sensed intake manifold air pressure and the calculated intake manifold air pressure is not less than the predetermined value.

Preferably, a first error counter is increased if it is determined that the MAP sensor signal is not within the predetermined range, and the calculated intake manifold air pressure is determined as the actual intake manifold air pressure if the first error counter is greater than a predetermined value.

It is preferable that a second error counter is increased if it is determined that the difference between the sensed intake manifold air pressure and the calculated intake manifold air pressure is not less than a predetermined value, and the calculated intake manifold air pressure is determined as the actual intake manifold air pressure if the second error counter is greater than a predetermined value.

Preferably, the determining whether a difference between the sensed intake manifold air pressure and the calculated intake manifold air pressure is less than a predetermined value is performed if a throttle position sensor, a camshaft position sensor, and an intake air temperature sensor operate normally.

It is also preferable that the determining whether a difference between the sensed intake manifold air pressure and the calculated intake manifold air pressure is less than a predetermined value is performed if an engine speed is lower than a predetermined speed.

It is further preferable that the determining whether a difference between a sensed intake manifold air pressure and the calculated intake manifold air pressure is less than a predetermined value is performed if a rate of change of a throttle position is less than a predetermined rate.

The one or more engine operating parameters comprise an engine speed, a throttle position, an atmospheric pressure, and an intake air temperature.

In a further preferred embodiment of the present invention, the calculating comprises: calculating a raw air flow drawn into an intake manifold; calculating an adjusted air flow drawn into an intake manifold through an adjustment of the calculated raw air flow; calculating a pressure change based on the calculated adjusted air flow; and calculating the intake manifold air pressure based on the calculated pressure change.

Preferably, the raw air flow is calculated as a sum of a basic air flow passing through a throttle body according to an engine speed and a throttle position, an air flow passing through an idle speed actuator, and a leakage air flow.

It is preferable that the adjustment is performed by multiplying the raw air flow by an air temperature coefficient and a pressure ratio coefficient.

Preferably, the air temperature coefficient Corr_Temp is calculated according to the following equation:

$$\text{Corr\_Temp} = \sqrt{\frac{T_0}{T_0 + Tin}}$$

where $T_0$ is a predetermined reference temperature and Tin is a current intake air temperature.

It is also preferable that the pressure ratio coefficient Corr_RPRESS is determined according to the following equation:

$$\text{Corr\_RPRESS} = \sqrt{\frac{2k}{k-1}\text{Pth\_in}\left\{\text{Pth\_in}\left(\frac{\text{Pin\_mod\_old}}{\text{Pth\_in}}\right)^{\frac{2}{k}} - \left(\frac{\text{Pin\_mod\_old}}{\text{Pth\_in}}\right)^{\frac{k+1}{k}}\right\}}$$

where Pth_in is a pressure before a throttle plate, Pth_mod_old is a previously calculated intake manifold air pressure, and k is a specific heat ratio.

Preferably, the pressure change (delta_P) is calculated according to the following equation:

$$\text{delta\_P} = \frac{(\text{m\_th\_in} - \text{m\_cylinder\_old}) \times R \times Tin}{Vs}$$

where m_th_in is the adjusted air flow drawn into the intake manifold, m_cylinder_old is a previous adjusted air flow drawn into a cylinder, Tin is an intake air temperature, Vs is a volume of the intake manifold, and R is a gas constant.

Preferably, method further comprises calculating an air flow drawn into the cylinder based on the calculated intake manifold air pressure, a residual gas pressure in the cylinder, and a predetermined coefficient. The residual gas pressure and the predetermined coefficient can be determined based on an engine speed.

In another preferred embodiment of the present invention, the Manifold Air Pressure (MAP) sensor diagnostic system comprises a MAP sensor and a control unit. The MAP sensor detects an intake manifold air pressure and generates a signal indicative of the detected pressure. The control unit diagnoses malfunctions of the MAP sensor based on one or more engine operating parameters and the MAP sensor signal, the control unit being programmed to perform a control method comprising: determining whether a MAP sensor signal is within a predetermined range; calculating an intake manifold air pressure based on one or more engine operating parameters; determining whether a difference between a sensed intake manifold air pressure indicated by the MAP sensor output signal and the calculated intake manifold air pressure is less than a predetermined value if it is determined that the MAP sensor signal is within the predetermined range; and selecting the calculated intake manifold air pressure as an actual intake manifold air pressure if the MAP sensor is not within the predetermined range, or if the difference between the sensed intake manifold air pressure and the calculated intake manifold air pressure is not less than the predetermined value.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

Like numerals refer to similar elements throughout the several drawings.

DETAILED DESCRIPTION OF THE PREFERRED EMBODIMENTS

Figure 1:
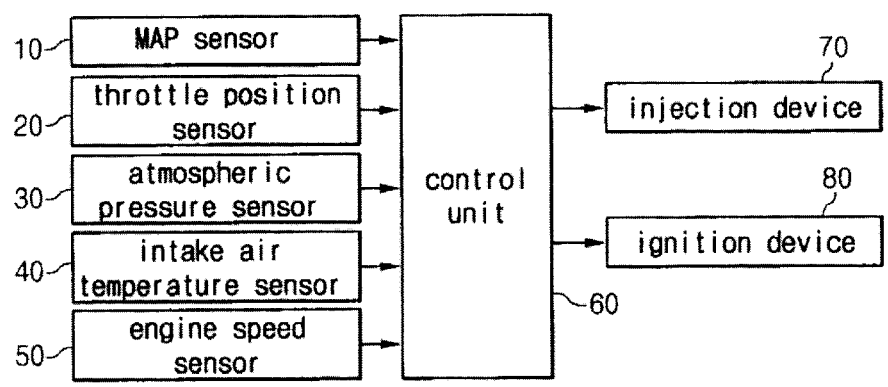
FIG. 1 is a block diagram of a system for diagnosing a manifold air pressure sensor according to the invention.

As shown in FIG. 1, a diagnostic system according to the preferred embodiment of the present invention includes: a manifold air pressure sensor 10, a throttle position sensor 20, an atmospheric pressure sensor 30, an air temperature sensor 40, an engine speed sensor 50, a control unit 60, an injection device 70, and an ignition device 80.

The manifold air pressure sensor (hereinafter referred to as a MAP sensor) 10 detects a pressure inside a manifold (hereinafter referred to as a manifold air pressure) and issues a corresponding signal. The throttle position sensor 20 detects a throttle plate position and issues a corresponding signal. The atmospheric pressure sensor 30 detects an atmospheric pressure and issues a corresponding signal. The intake air temperature sensor 40 detects a temperature of air drawn into a combustion chamber and issues a corresponding signal. The engine speed sensor 50 detects an engine speed and issues a corresponding signal. These signals may all be, for example, voltage signals.

The control unit 60 receives signals from the above sensors. It performs a diagnosis of the MAP sensor 10 based on the signal of the MAP sensor and an estimation of a manifold air pressure from a mathematical model for an intake system. The control unit issues an injection command signal and an ignition command signal. The injection device 70 injects fuel into the intake system according to the injection command signal and the ignition device 80 ignites an air-fuel mixture in a combustion chamber according to the ignition command signal.

The control unit 60 preferably includes such conventional elements as a central processor, an input-output unit, a memory, and other necessary hardware and software components as will be understood by persons skilled in the art to permit the control unit to communicate with sensors and execute the control functions as described herein.

Figure 2:
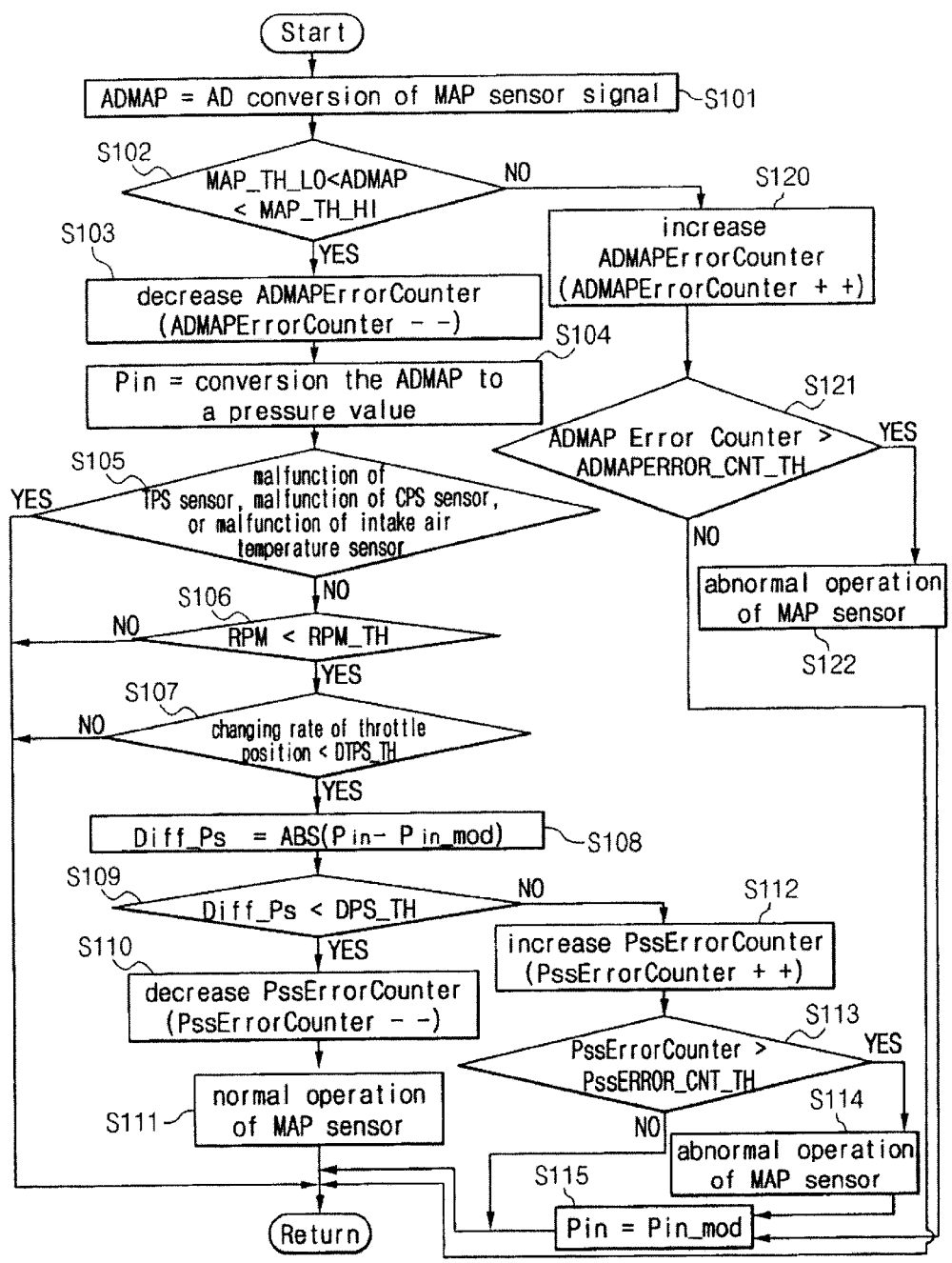
FIG. 2 is a flowchart showing a method for diagnosing a manifold air pressure sensor according to the preferred embodiment of the present invention.
Figure 3:
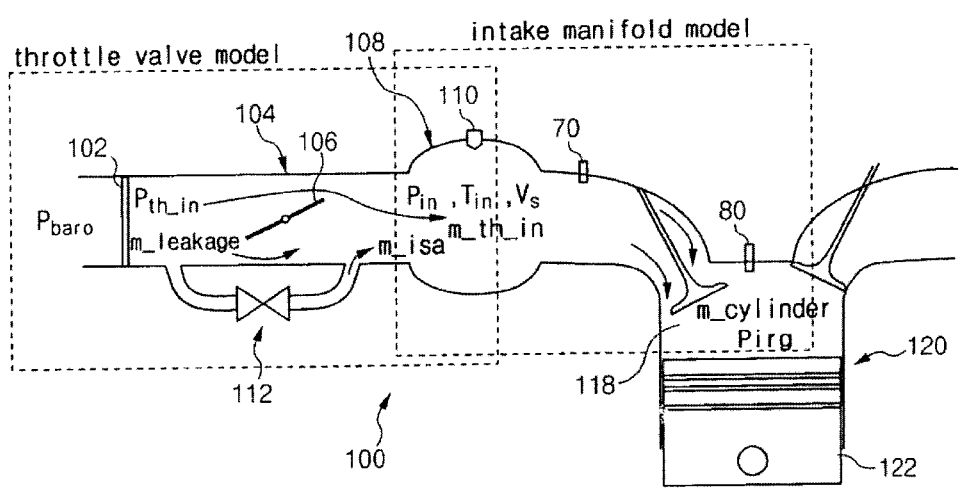
FIG. 3 is a schematic diagram of the intake system models used to estimate manifold air pressure according to the preferred embodiment of the present invention.

FIG. 3 diagrams an engine system 100 to which the diagnostic method according to the present invention may be applied. Inlet air at barometric pressure $P_{baro}$ passes through an air filter 102 and is drawn through a throttle body 104 in which a throttle plate 106 is rotatably disposed. The position of the throttle plate is manually or automatically controlled to variably restrict the inlet air passing through the throttle body 104. This position is detected by the throttle position sensor 20. A portion of the inlet air is routed past a conventional idle speed actuator 112. Airflow out of the throttle body 104 is drawn into an intake manifold 108. A conventional pressure sensor (hereinafter referred to as a MAP sensor) 110 is exposed to gas pressure in the intake manifold 108 and provides a manifold air pressure to the control unit 60 (FIG. 2) according to conventional protocols. The intake manifold 108 communicates with a combustion chamber 118 of an engine cylinder 120 in which a piston 122 is reciprocally disposed.

Referring to FIG. 2, in step S101 the control unit 60 receives an analog signal indicative of a manifold air pressure from the MAP sensor 10, and converts the analog signal to a digital signal ADMAP. The analog signal of the MAP sensor is preferably a voltage signal. In step S102, the control unit 60 then determines whether the ADMAP is within a regular output range of the MAP sensor, that is, between an upper threshold MAP_TH_HI and a lower threshold MAP_TH_LO. The regular range is preferably preset by a person of ordinary skill in the art. In step S102, if the ADMAP is between the upper threshold MAP_TH_HI and the lower threshold MAP_TH_LO, the control unit 60 decreases an error counter ADMAPErrorCounter at step S103, and then in step S104 converts the ADMAP to a corresponding pressure value.

The error counter ADMAPErrorCounter is a flag representative of the number of times of error determination, and the ADMAPErrorCounter is updated at every iteration in a preferred embodiment. That is, if it is determined that the ADMAP is between the upper threshold MAP_TH_HI and the lower threshold MAP_TH_LO, the ADMAPErrorCounter is decreased by 1, and if not, it is increased by 1.

In a preferred embodiment of the present invention, the manifold air pressure is estimated from a mathematical model for the intake system using signals of the throttle position sensor 20, the atmospheric pressure sensor 30, and the intake air temperature sensor 40. If one of these sensors is not operating normally, it is impossible to estimate a precise manifold air pressure from the model and the method ends. Therefore, in step S105 the control unit 60 then determines whether the throttle position sensor 20, the atmospheric pressure sensor 30, the intake air temperature sensor 40, and a crank position sensor (not shown) are operating normally. The determination in step S105 may be performed based on signals of the sensors and various vehicle operating parameters, as generally is understood by one of ordinary skill in the art.

If all three sensors are operating normally, in step S106 the control unit 60 determines whether the current engine speed detected by the engine speed sensor 50 is less than a predetermined speed RPM_TH. An engine speed above RPM_TH suggests a rapid change in engine speed, or a rapid acceleration of a vehicle. In such situations the diagnosis of the MAP sensor is not credible and the method ends.

If it is determined that the current engine speed is less than the predetermined speed RPM_TH, in step S107 the control unit 60 determines whether the rate of change of the throttle position DTPS is less than a predetermined rate DTPS_TH. If the rate of change of the throttle position DTPS is not less than the predetermined rate DTPS_TH, the procedure ends. If the rate of change of the throttle position DTPS is less than the predetermined rate DTPS_TH, in step S108 the control unit 60 calculates an absolute difference (Diff_Ps) between the manifold air pressure (Pin) detected by the MAP sensor 10 and an estimated manifold air pressure (Pin_mod), estimated from a mathematical model of the intake system. The estimation of the manifold air pressure will be described within.

In step S109, it is then determined whether the difference Diff_Ps is less than a predetermined value DPS_TH. If so, in step S110 the control unit 60 decreases the error counter PssErrorCounter, preferably to zero, concluding that the MAP sensor is operating normally in step S111. Therefore, the manifold air pressure detected by the MAP sensor can be used by various engine controls, such as the fuel injection control or the ignition control. The PssErrorCounter is preferably not allowed to go negative. Error Counters such as ADMAPErrorCounter/PssErrorCounter are generally referred to as an "Error Bounce Counter," and they are counters for determining whether an error state continues for a predetermined period after the error was detected. Therefore, if there is no error, they are preferably set to 0.

If the calculated difference Diff_Ps is not less than the predetermined value DPS_TH, in step S112 the control unit 60 increases the error counter PssErrorCounter. In step S113 it determines whether the error counter PssErrorCounter is greater than a predetermined value PssERROR_CNT_TH, if not, the procedure ends.

The error counter PssErrorCounter is a flag representative of the number of times of error determination, and the PssErrorCounter is updated at every iteration of the method of the FIG. 3. That is, if it is determined that the difference Diff_Ps is less than the predetermined value, the PssErrorCounter, is decreased by 1, and if it is not, it is increased by 1.

If the determination is in the affirmative in step S113, in step S114 the MAP sensor is considered to be operating abnormally. And, in step S115 the control unit 60 designates the calculated manifold air pressure from the mathematical model of the intake system (Pin_mod) as the intake manifold air pressure (Pin=Pin_mod).

Returning to step S102, if it is determined that the ADMAP is not between the upper threshold MAP_TH_HI and the lower threshold MAP_TH_LO, in step S120 the control unit increases the error counter ADMAPErrorCounter. The ADMAPErrorCounter is a counter for diagnosing an electrical error, e.g., a short circuit or an open circuit, of a MAP sensor. That is, ADMAPErrorCounter is used to determine whether a digital signal of the MAP sensor is not between an upper threshold and a lower threshold.

In step S121 the control unit 60 then determines whether the error counter value ADMAPErrorCounter is greater than a predetermined value ADMAPERROR_CNT_TH. If not, the procedure ends. If the error counter value ADMAPErrorCounter is greater than the predetermined value ADMAPERROR_CNT_TH, in step S122 the MAP sensor is considered to be operating abnormally and the procedure advances to step SI 15, described previously.

The control unit 60 determines an amount of fuel for injection and an ignition timing based on the manifold air pressure (Pin) and issues an injection command signal in response to the determined amount of fuel to the injector 70 (FIG. 3) and an ignition command signal in response to the determined ignition timing.

Figure 4:
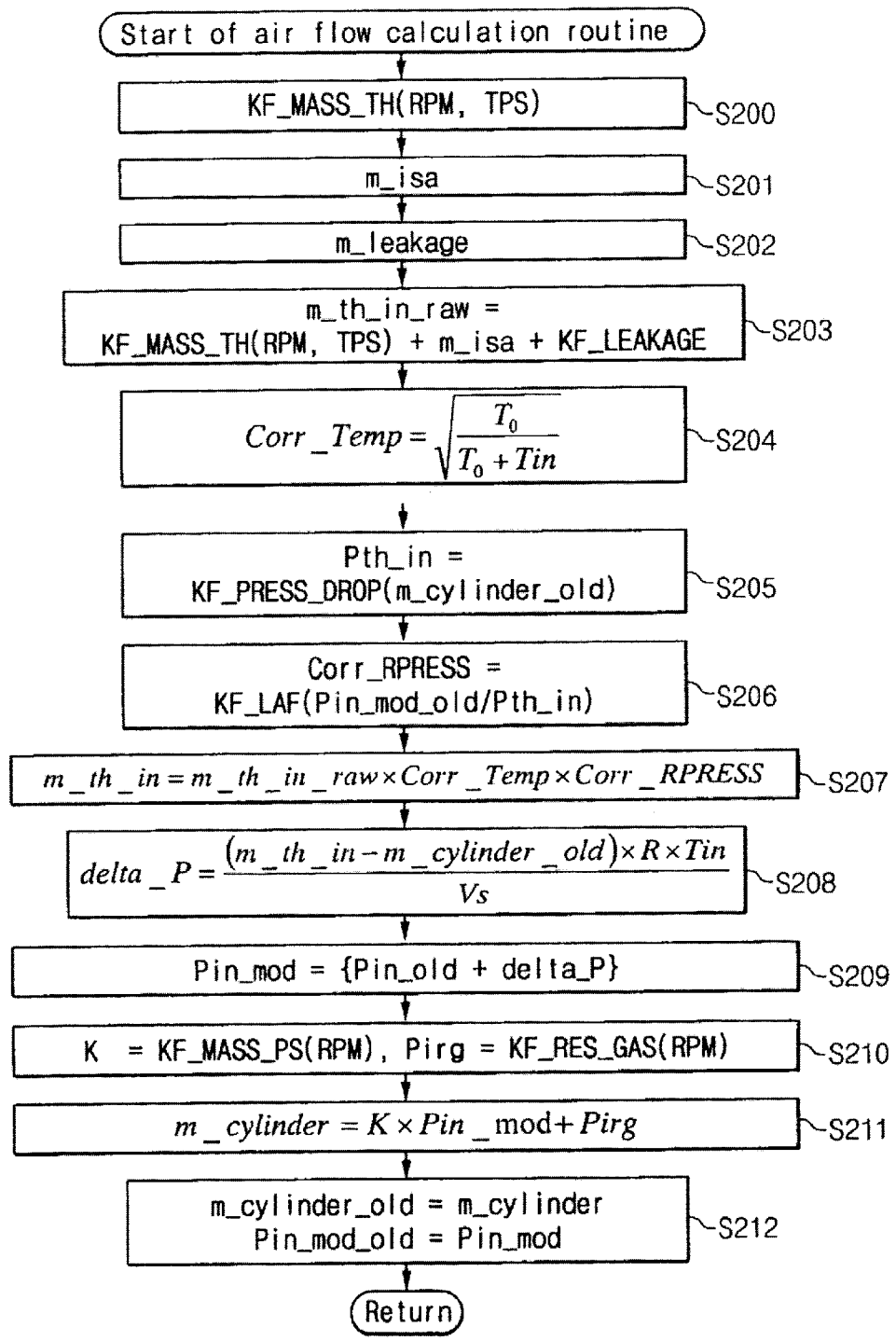
FIG. 4 is a flowchart showing a method for determining manifold air pressure from the intake system models of FIG. 3 according to the preferred embodiment of the present invention.

Referring to FIG. 4, the process for estimating a manifold air pressure Pin_mod using a mathematical model includes using a throttle valve model and an intake manifold model. The throttle valve model models the space extending from the air filter to the throttle valve, including the idle speed actuator valve (hereinafter referred to as an ISA valve). From this throttle valve model, a basic air flow is calculated based on an engine speed and a throttle position. The basic air flow is adjusted using the pressure difference across the throttle valve.

The intake manifold model models the space extending from the intake manifold to the combustion chamber. From this intake manifold model, the volume of air flow drawn into the intake manifold during a predetermined period of time can be obtained by applying the law of conservation of mass to the intake manifold and the combustion chamber. A pressure difference during the predetermined period of time can be obtained from the volume of air flow.

The diagnosis of the MAP sensor is performed by repeatedly performing the method as shown in FIG. 2. When it is determined that the MAP sensor is in an abnormal state, the calculated intake manifold air pressure (Pin_mod) sets the value of the current intake manifold air pressure (Pin) because at that point the calculated intake manifold pressure (Pin_mod) is more credible.

As shown in FIG. 4, in step S200 the control unit 60 obtains the air flow (KFMMASS_TH) passing through the throttle body from a predetermined look-up table. The predetermined look-up table provides an air flow as a function of engine speed and throttle valve position. The air flow passing through a throttle body at a specific engine speed and a throttle position is determined experimentally. It generally increases as the engine speed and the throttle position increase.

In step S201, the control unit 60 determines the air flow (m_isa) passing through the idle speed actuator. This is obtained from a predetermined look-up table providing a value of air flow passing through the idle speed actuator as a function of the ISA valve position, as is generally understood in the art. In step S202, the control unit 60 acquires a value for leakage air flow that passes through the throttle body while the throttle valve is fully closed. Preferably, the leakage air flow value is also predetermined experimentally.

In step S203, the control unit 60 calculates a basic air flow (m_th_in_raw), which is drawn into the intake manifold, through a sum of the KF_MASS_TH, m_isa, and m_leakage. The calculation of m_th_in_raw is performed for a standard chosen set of engine states, so it is needed to adjust the calculated value taking the current engine states into consideration.

In step S204, for the calibration of the basic air flow, an air temperature coefficient Coor_Temp is calculated, as follows:

$$\text{Corr\_Temp} = \sqrt{\frac{T_0}{T_0 + Tin}}$$

$T_0$ is a predetermined reference temperature, and Tin is a current temperature in degrees Kelvin (K) of air currently drawn into the intake manifold. $T_0$ is preferably determined as the absolute temperature equivalent of 0° C., that is, 273 K.

Figure 6:
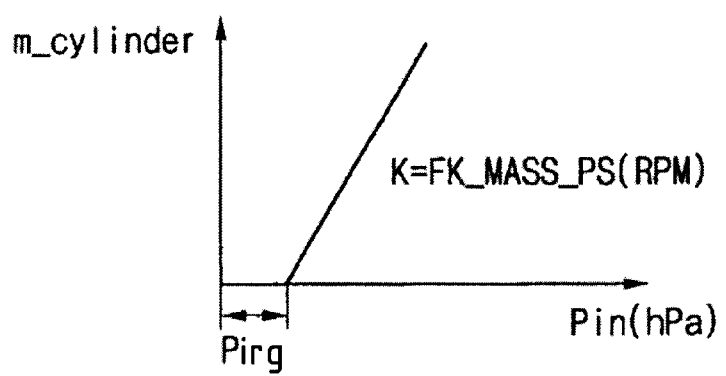
FIG. 6 is a graph of air flow drawn into a combustion chamber as a function of the manifold air pressure according to the preferred embodiment of the present invention.

Then, a pressure ratio coefficient Corr_RPRESS is determined in order to adjust the basic air flow, but a brief discussion of FIG. 6 first will facilitate the description.

FIG. 6 shows a graph depicting a mass air flow ratio through a throat such as a throttle body. The mass air flow varies according to a pressure ratio across the throttle body. When the pressure ratio is equal to 1, that is, pressures of both sides of the throttle body are equal, the mass air flow is 0. As the pressure ratio decreases, the mass air flow increases. The mass air flow rate effectively becomes a maximum value at the pressure ratio of 0.5283. Although the pressure ratio becomes smaller than 0.5823, the mass air flow does not significantly decrease beyond this point.

Figure 5:
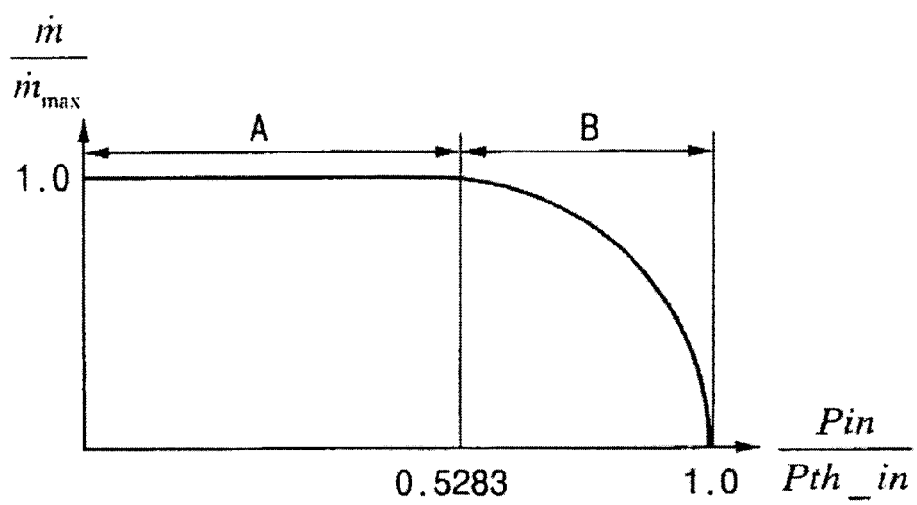
FIG. 5 is a graph of the relation between a ratio of the mass air flow and a ratio of pressure across the throttle plate.

Now returning to FIG. 5, the pressure ratio coefficient Corr_RPRESS is determined as a function of the pressure ratio across the throttle plate. Therefore, pressures in both sides of the throttle plate are needed to determine the pressure ratio coefficient. In step S205, the pressure Pth_in between the air filter and the throttle plate may be obtained from a predetermined look-up table according to air flow drawn into a combustion chamber. The pressure Pth_in becomes lower as the air flow drawn into the combustion chamber increases. An increase of drag caused by an increase of intake air flow speed lowers the Pth_in, as is generally understood in the art. The pressure in the intake manifold is taken to be the intake manifold pressure from the previous iteration of the method. Therefore, the pressure inside the intake manifold is Pin_mod_old.

In step S206, the pressure ratio coefficient Corr_RPRESS is determined as a function of a ratio of Pin_mod_old with respect to Pth_in. Corr_RPRESS may also be obtained from a look-up table providing a coefficient as a function of a ratio of Pin_mod_old with respect to Pth_in.

Corr_RPRESS is determined as follows:

$$\text{Corr\_RPRESS} = \sqrt{\frac{2k}{k-1} \text{Pth\_in} \left\{ \text{Pth\_in} \left( \frac{\text{Pin\_mod\_old}}{\text{Pth\_in}} \right)^{\frac{2}{k}} - \left( \frac{\text{Pin\_mod\_old}}{\text{Pth\_in}} \right)^{\frac{k+1}{k}} \right\}}$$

where k is a specific heat ratio. As is generally known, k is 1.4 for air, and 1.26~1.27 for a stoichiometric air-fuel mixture.

In step S207, an air flow m_th_in that flows into the intake manifold is determined as follows:

$$m\_th\_in = m\_th\_in\_raw \times Corr\_Temp \times Corr\_RPRESS.$$

Then, in step S208, a pressure change delta_P is calculated from the air flow difference using a gas law. The pressure change is caused by the difference between the air flow drawn into the intake manifold and the air flow drawn into a combustion chamber as follows:

$$\text{delta\_P} = \frac{(m\_th\_in - m\_cylinder\_old) \times R \times Tin}{V_s}$$

where R is the gas constant and Vs is the volume of the intake manifold.

In step S209, the estimated intake air pressure Pin_mod is the sum of the pressure change delta_P and the previous manifold air pressure Pin_old. In step S210, a residual gas pressure Pirg is determined from a look-up table that provides the residual gas pressure as a function of an engine speed, and a constant K is determined from a look-up table that provides the constant K as a function of an engine speed.

In step S211, a mass air flow (m_cylinder) is determined from the calculated intake manifold air pressure Pin_mod. FIG. 7 shows the relation (m_cylinder=K*Pin+Pirg) between the intake manifold pressure (Pin) and the mass air flow (m_cylinder). In step S211, mass air flow (m_cylinder) drawn into a combustion chamber is obtained from the following equation using relationship from FIG. 7:

$$m\_\text{cylinder} = K \times Pin\_mod + Pirg$$

The values for Pin_mod_old and m_cylinder_old are updated in step S212. The calculated air flow (m_cylinder)

is then used for various engine controls such as fuel injection control and ignition control.

As stated in the above, the MAP sensor diagnostic method according to a preferred embodiment of the present invention estimates the intake manifold air pressure using various engine operating conditions including an engine speed, a throttle position, an intake air temperature, and an atmospheric pressure, and compares the estimated intake air pressure to a pressure detected by the MAP sensor. Thus, the MAP sensor output becomes more credible. If it is determined that the MAP sensor is operating abnormally, the estimated pressure is used as the intake manifold pressure because it provides a more accurate pressure value.

Although preferred embodiments of the present invention have been described in detail hereinabove, it should be clearly understood that many variations and/or modifications of the basic inventive concepts taught herein which may appear to those skilled in the present art, will still fall within the sprit and scope of the present invention, as defined in the appended claims.

What is claimed is:

1. A manifold air pressure (MAP) sensor diagnostic method, comprising:
    determining whether a MAP sensor signal is within a predetermined range;
    calculating an intake manifold air pressure based on one or more engine operating parameters;
    determining whether a difference between a sensed intake manifold air pressure indicated by the MAP sensor signal and the calculated intake manifold air pressure is less than a predetermined value, if it is determined that the MAP sensor signal is within the predetermined range; and
    selecting the calculated intake manifold air pressure as an actual intake manifold air pressure if the MAP sensor signal is not within the predetermined range, or if the difference between the sensed intake manifold air pressure and the calculated intake manifold air pressure is not less than the predetermined value.

2. The diagnostic method of claim 1, wherein a first error counter is increased if it is determined that the MAP sensor signal is not within the predetermined range, and wherein the calculated intake manifold air pressure is determined as the actual intake manifold air pressure if the first error counter is greater than a predetermined value.

3. The diagnostic method of claim 1, wherein a second error counter is increased if it is determined that the difference between the sensed intake manifold air pressure and the calculated intake manifold air pressure is not less than a predetermined value, and wherein the calculated intake manifold air pressure is determined as the actual intake manifold air pressure if the second error counter is greater than a predetermined value.

4. The diagnostic method of claim 1, wherein said determining whether a difference between the sensed intake manifold air pressure and the calculated intake manifold air pressure is less than a predetermined value is performed if a throttle position sensor, a camshaft position sensor, and an intake air temperature sensor operate normally.

5. The diagnostic method of claim 1, wherein said determining whether a difference between the sensed intake manifold air pressure and the calculated intake manifold air pressure is less than a predetermined value is performed if an engine speed is lower than a predetermined speed.

6. The diagnostic method of claim 1, wherein said determining whether a difference between the sensed intake manifold air pressure and the calculated intake manifold air pressure is less than a predetermined value is performed if a rate of change of a throttle position is less than a predetermined rate.

7. The diagnostic method of claim 1, wherein the one or more engine operating parameters comprise an engine speed, a throttle position, an atmospheric pressure, and an intake air temperature.

8. The method of claim 1, wherein said calculating comprises:
    calculating a raw air flow drawn into an intake manifold;
    calculating an adjusted air flow drawn into an intake manifold through an adjustment of the calculated raw air flow;
    calculating a pressure change based on the calculated adjusted air flow; and
    calculating the intake manifold air pressure based on the calculated pressure change.

9. The diagnostic method of claim 8, wherein the raw air flow is calculated as a sum of a basic air flow passing through a throttle body according to an engine speed and a throttle position, an air flow passing through an idle speed actuator, and a leakage air flow.

10. The diagnostic method of claim 8, wherein said adjustment of the calculated raw air flow is performed by multiplying the raw air flow by an air temperature coefficient and a pressure ratio coefficient.

11. The diagnostic method of claim 10, wherein the air temperature coefficient (Corr_Temp) is calculated according to the following equation:

$$\text{Corr\_Temp} = \sqrt{\frac{T_0}{T_0 + Tin}}$$

where $T_0$ is a predetermined reference temperature and $Tin$ is a current intake air temperature.

12. The diagnostic method of claim 10, wherein the pressure ratio coefficient (Corr_RPRESS) is determined according to the following equation:

$$\text{Corr\_RPRESS} = \sqrt{\frac{2k}{k-1}\text{Pth\_in}\left\{\text{Pth\_in}\left(\frac{\text{Pin\_mod\_old}}{\text{Pth\_in}}\right)^{\frac{2}{k}} - \left(\frac{\text{Pin\_mod\_old}}{\text{Pth\_in}}\right)^{\frac{k+1}{k}}\right\}}$$

where Pth_in is a pressure before a throttle plate, Pth_mod_old is a previously calculated intake manifold air pressure, and k is a specific heat ratio.

13. The diagnostic method of claim 8, wherein said pressure change (delta_P) is calculated according to the following equation:

$$\text{delta\_P} = \frac{(\text{m\_th\_in} - \text{m\_cylinder\_old}) \times R \times Tin}{Vs}$$

where m_th_in is the adjusted air flow drawn into the intake manifold, m_cylinder_old is a previous adjusted air flow drawn into a cylinder, Tin is an intake air temperature, Vs is a volume of the intake manifold, and R is a gas constant.

14. The diagnostic method of claim 8, further comprising calculating an air flow drawn into the cylinder based on the calculated intake manifold air pressure, a residual gas pressure in the cylinder, and a predetermined coefficient.

15. The diagnostic method of claim 14, wherein the residual gas pressure and the predetermined coefficient are determined based on an engine speed.

16. A manifold air pressure (MAP) sensor diagnostic system, comprising:
   a MAP sensor detecting an intake manifold air pressure and generating a signal indicative of the detected pressure; and
   a control unit diagnosing malfunctions of the MAP sensor based on one or more engine operating parameters and the MAP sensor signal, the control unit being programmed to perform a control method comprising:
   determining whether a MAP sensor signal is within a predetermined range;
   calculating an intake manifold air pressure based on one or more engine operating parameters;
   determining whether a difference between a sensed intake manifold air pressure indicated by the MAP sensor signal and the calculated intake manifold air pressure is less than a predetermined value, if it is determined that the MAP sensor signal is within the predetermined range; and
   selecting the calculated intake manifold air pressure as an actual intake manifold air pressure if the MAP sensor signal is not within the predetermined range, or if the difference between the sensed intake manifold air pressure and the calculated intake manifold air pressure is not less than the predetermined value.

17. The diagnostic system of claim 16, wherein said determining whether a difference between the sensed intake manifold air pressure and the calculated intake manifold air pressure is less than a predetermined value is performed if a throttle position sensor, a camshaft position sensor, and an intake air temperature sensor operate normally.

18. The diagnostic system of claim 16, wherein said determining whether a difference between the sensed intake manifold air pressure and the calculated intake manifold air pressure is less than a predetermined value is performed if an engine speed is lower than a predetermined speed.

19. The diagnostic system of claim 16, wherein the one or more engine operating parameters comprise an engine speed, a throttle position, an atmospheric pressure, and an intake air temperature.

20. A diagnostic method for a manifold air pressure (MAP) sensor, comprising:
   determining that a MAP sensor signal is within a predetermined range;
   calculating an adjusted intake manifold air pressure without using the MAP sensor signal;
   converting the MAP sensor signal to a sensed intake manifold air pressure;
   determining an absolute difference between the sensed intake manifold air pressure and the adjusted intake manifold air pressure; and,
   concluding that the MAP sensor is operating abnormally, if the absolute difference is more than a threshold value.

21. The method of claim 20, further comprising selecting the adjusted intake manifold air pressure and not the sensed intake manifold air pressure for running an engine.

22. The method of claim 20, further comprising:
   decreasing a first error counter, if the absolute difference is less than a threshold value;
   increasing the first error counter, if the absolute difference is greater than a threshold value;
   repeating the method while an engine is running; and
   wherein said concluding comprises concluding that the MAP sensor is operating abnormally, if the absolute difference is more than a threshold value and if a first error counter is greater than a first error threshold.

* * * * *